(12) United States Patent
Brisebois

(10) Patent No.: US 8,190,194 B2
(45) Date of Patent: May 29, 2012

(54) FEMTO CELL VISITATION HISTORY FOR LOCATION BASED SERVICES

(75) Inventor: Arthur Richard Brisebois, Cumming, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 564 days.

(21) Appl. No.: 12/342,967

(22) Filed: Dec. 23, 2008

(65) Prior Publication Data

US 2010/0159945 A1    Jun. 24, 2010

(51) Int. Cl.
*H04M 1/00* (2006.01)
(52) U.S. Cl. .................. 455/550.1; 455/456.1; 455/433; 370/328
(58) Field of Classification Search ............... 455/550.1, 455/456.1, 433; 370/328
See application file for complete search history.

(56) References Cited

U.S. PATENT DOCUMENTS

| 2003/0190911 | A1* | 10/2003 | Hirano | 455/423 |
| 2007/0105527 | A1* | 5/2007 | Nylander et al. | 455/403 |
| 2009/0010223 | A1* | 1/2009 | Hirano | 370/331 |
| 2009/0138446 | A1* | 5/2009 | Kalavade | 707/3 |

* cited by examiner

*Primary Examiner* — Danh Le
(74) *Attorney, Agent, or Firm* — Turocy & Watson LLP

(57) ABSTRACT

System(s) and method(s) are provided for collection and communication of data on handset attachment procedure, or visitation, to one or more femto cells to provide location information. A mobility component receives actual subscriber and femto access point (AP) attachment signaling and extracts visitation data that facilitates generation of real-time or historical visitation reports. Location information is conveyed through visitation reports which can include mobile device identifier(s), femto AP location, and a timestamp. Visitation reports also can include processed visitation data such as mobility matrices, historical mobility patterns or profiles, and predicted mobility events. Provision of location information occurs without the need for dedicated handset functionality, and associated hardware, or additional battery draw.

28 Claims, 11 Drawing Sheets

FEMTO CELL VISITATION HISTORY FOR LOCATION BASED SERVICES

TECHNICAL FIELD

The subject innovation relates to wireless communications and, more particularly, to collection and communication of data on handset attachment procedure, or visitation, to one or more femto cells to provide location information at reduced handset hardware complexity and cost, and battery draw.

BACKGROUND

Femto cells—building-based wireless access points interfaced with a wired broadband network—are generally deployed to improve indoor wireless coverage and to offload a mobility radio access network (RAN) operated by a wireless network and service provider. Femto cells typically operate in licensed portions of the electromagnetic spectrum, and generally offer plug-and-play installation; e.g., automatic configuration of femto AP subsequent to femto cell subscriber registration with a service provider. Improved indoor coverage includes stronger signal and improved reception (e.g., voice or data), ease of session or call initiation, and session or call retention as well. Offloading a RAN reduces operational and transport costs for a service provider since a lesser number of end users utilizes over-the-air (OTA) radio resources (e.g., radio frequency bands and channels), which are typically limited.

Coverage of a femto cell, or femto access point (AP), is generally intended to be confined within the bounds of an indoor compound (e.g., a residential or commercial building) in order to mitigate interference among mobile stations covered by a macro cell and terminals covered by the femto AP. Additionally, confined coverage can reduce cross-talk among terminals serviced by disparate, neighboring femto cells as well. Coverage improvements via femto cells can also mitigate customer attrition as long as a favorable subscriber perception regarding voice coverage and other data services with substantive delay sensitivity, or otherwise, is attained. In addition, a richer variety of wireless voice and data services can be offered to customers via a femto cell since such service offerings do not rely primarily on mobility RAN resources.

Subscriber location information is valuable intelligence, or information, that facilitates delivery of various location-specific services and marketing, which can include advertisement campaigns related to femto cell service. As an example, information services, e.g., subscriber-driven search, may be automatically tuned to suit the subscriber by sorting search results according to distance of entities in the search results from known location of the subscriber that conducted the search. As another example, advertisements and other marketing elements also may be pushed towards mobile device(s) display when a subscriber associated therewith is known to be near a business associated with the advertisement or marketing elements. Conventional mechanism(s) to track subscriber location typically have accuracy drawbacks, battery life inefficiencies, or require dedicated hardware that results in increases cost of mobile devices.

SUMMARY

The following presents a simplified summary of the innovation in order to provide a basic understanding of some aspects of the invention. This summary is not an extensive overview of the invention. It is intended to neither identify key or critical elements of the invention nor delineate the scope of the subject innovation. Its sole purpose is to present some concepts of the invention in a simplified form as a prelude to the more detailed description that is presented later.

The subject innovation provides system(s) and method(s) for collection and communication of data on handset attachment procedure, or visitation, to one or more femto cells to provide location information. A mobility component receives actual subscriber and femto access point (AP) attachment signaling and extracts visitation data that facilitates generation of real-time or historical visitation reports. Location information is conveyed through visitation reports, which in real-time reporting can include mobile device identifier(s), femto AP location, and a timestamp. Historical reporting can include processed visitation data such as mobility matrices, historical mobility patterns or profiles, and predicted mobility events. Historical visitation reports can span a time interval configured by one or more mobile network components. Format of visitation reports can be requested through signaling conveyed by an entity that consumes location information. Provision of location information occurs without the need for dedicated handset functionality, and associated hardware, or additional battery draw.

At least three advantages of the subject innovation and are that (i) it provides accurate subscriber location supplied with most any or any handset that utilizes same radio technology as deployed femto cells; (ii) additional handset receivers or transmitters (e.g., Wi-Fi or GPS transceiver(s)) or associated circuitry are not required; and (iii) signaling associated with location information from and to handset(s) is substantially mitigated with the ensuing handset battery draw reduction with respect to mechanism that generate location intelligence through substantive signaling. It is noted that at least advantage (i)-(iii) can expand the appeal and market share of location based services substantially beyond current limitation(s) imposed by handset hardware and traffic-dependent location reporting techniques or mechanisms.

Aspects, features, or advantages of the subject innovation described the subject specification can be exploited in substantially any wireless communication technology, in connection with access point power management. For instance, Wi-Fi, Worldwide Interoperability for Microwave Access (WiMAX), Enhanced GPRS or Enhanced Data Rates for GSM (EDGE), 3rd Generation Partnership Project (3GPP) Long Term Evolution, 3rd Generation Partnership Project 2 (3GPP2) Ultra Mobile Broadband, 3GPP Universal Mobile Telecommunication System (UMTS), High-Speed Packet Access, or Zigbee. Additionally, substantially all aspects of the subject innovation as disclosed in the subject specification can be exploited in legacy telecommunication technologies such as GSM.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

DETAILED DESCRIPTION

Figure 1:
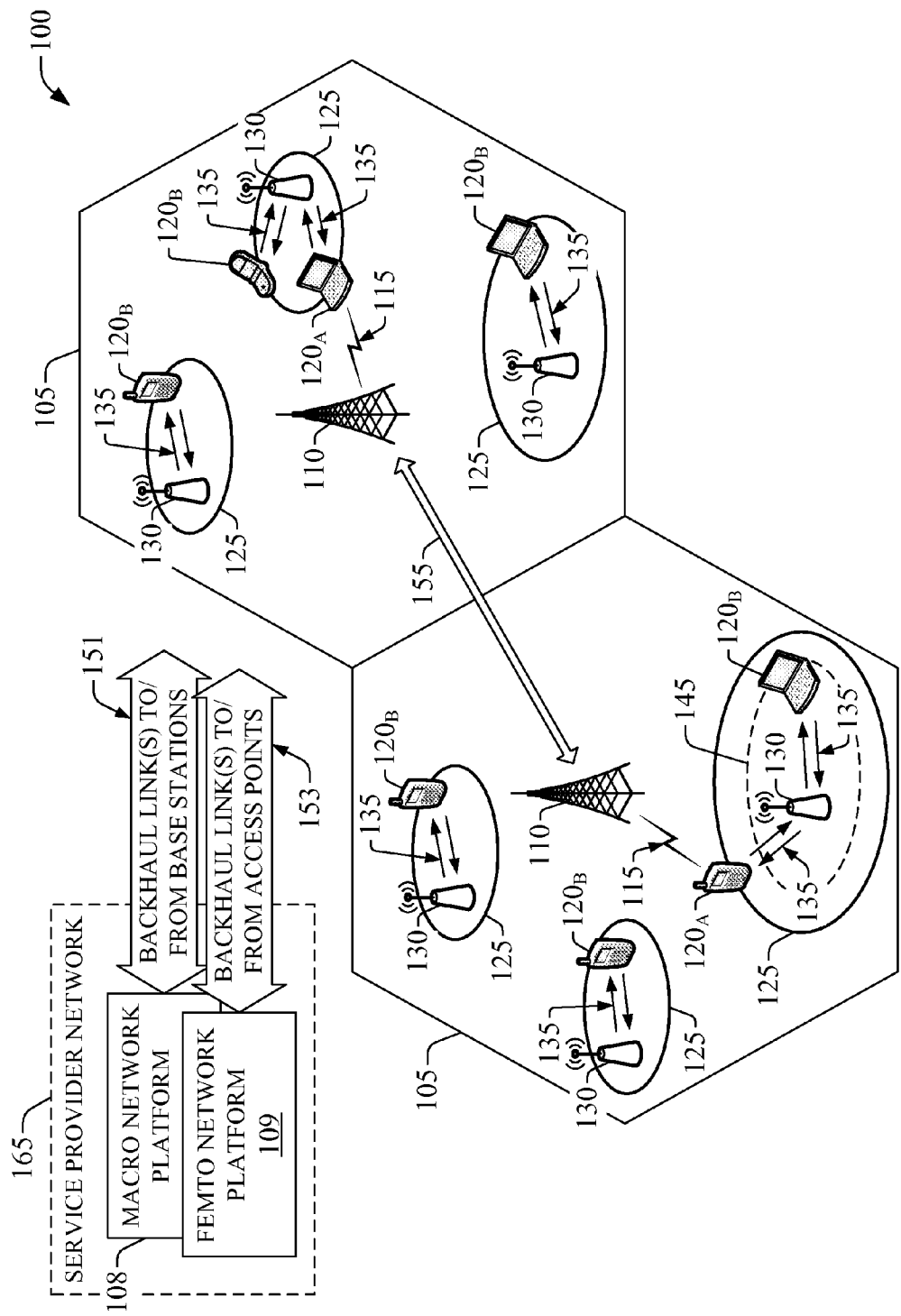
FIG. 1 illustrates a schematic deployment of a macro cells and a femto cells for wireless coverage, wherein femto cell access points can exploit aspects of the subject innovation.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "node," "system," "platform," "constructor," "interface," "layer" and the like are intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Furthermore, terms like "user equipment," "mobile station," "mobile," subscriber station," "access terminal," "terminal," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "Home Access Point," and the like, are utilized interchangeably in the subject application, and refer to a wireless network component or electronic appliance, or apparatus, that serves and receives data, control, voice, video, sound, gaming, or substantially any data-stream or signaling-stream from either a set of subscriber stations or network components (e.g., network platform(s), radio network controller(s), gateway node(s), serving node(s), control node(s), server(s) . . . ), or a combination thereof. Data and signaling streams can be packetized or frame-based flows. In addition, the terms "femto cell access point" or "femto access point" are utilized interchangeably.

Further yet, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms) which can provide simulated vision, sound recognition and so forth.

Wireless environments that include femto network deployments add a whole new layer, or dimension, of attachment procedure(s) frequency and location accuracy because femto cells, or femto APs, have relatively unique identifier(s), cover small confined areas compared to macro cells or sectors, and have known locations. As discussed in greater detail below, femto visitation history for location based services includes system(s) and method(s) to exploit real time and past femto "visitation" history of a subscriber to pinpoint a location thereof. In an aspect, femto visitation history can leverage known location, confined coverage area, and substantive number of femto cells to pinpoint subscriber location while in a subscriber station operates in the idle mode. Aspect, features, or advantages of the subject innovation and system(s) and method(s) therein can be applied to most any or any femto or macro radio technology; event though to facilitate explanation, non-limiting examples based at least in part on UMTS radio technology are utilized in the subject specification.

Referring to the drawings, FIG. 1 illustrates a wireless environment that includes macro cells and femto cells for wireless coverage in accordance with aspects described herein. In wireless environment 100, two areas 105 represent "macro" cell coverage, each macro cell is served by a base station 110. It should be appreciated that macro cells 105 are illustrated as hexagons; however, macro cells can adopt other geometries generally dictated by the deployment or floor plan, geographic areas to be covered (e.g., a metropolitan statistical area (MSA) or rural statistical area (RSA)), and so on. Macro coverage is generally intended to serve mobile wireless devices, like UE 120$_A$, in outdoors locations. An over-the-air wireless link 115 provides such coverage, the wireless link 115 comprises a downlink (DL) and an uplink (UL), and utilizes a predetermined band of the radio frequency (RF) spectrum. As an example, UE 120$_A$ can be a Third Generation Partnership Project (3GPP) Universal Mobile Telecommunication System (UMTS) mobile phone. It is noted that a base station, its associated electronics, circuitry or components, and a wireless link operated in accordance to the base station form a radio access network (RAN). In addition, base station 110 communicates via backhaul link(s) 151 with a macro network platform 108, which in cellular wireless technologies (e.g., 3rd Generation Partnership Project (3GPP) Universal Mobile Telecommunication System (UMTS), Global System for Mobile Communication (GSM)) represents a core network. In an aspect, macro network platform 108 controls a set of base stations 110 that serve either respective cells or a number of sectors within such cells. Macro network platform 108 also communicates with other base stations (not shown) that serve other cells (not shown). Backhaul link(s) 151 can include a wired backbone link (e.g., optical fiber backbone, twisted-pair line, T1/E1 phone line, a digital subscriber line (DSL) either synchronous or asynchronous, an asymmetric ADSL, or a coaxial cable . . . ). Backhaul pipe(s) 155 link disparate base stations 110.

In wireless environment 100, within one or more macro coverage cell 105, a set of femto cell 125 served by respective femto access points (APs) 130 can be deployed. While in illustrative wireless environment 100 three femto cells are deployed per macro cell, aspects of the subject innovation are geared to femto cell deployments with substantive femto AP density, e.g., $10^4$-$10^8$ femto APs 130 per base stations 110. A femto cell 125 typically covers an area that includes confined area 145, which is determined, at least in part, by transmission power allocated to femto AP 130, path loss, shadowing, and so forth. While coverage area 125 and confined area 145 typically coincide, it should be appreciated that in certain deployment scenarios, coverage area 125 can include an outdoor portion (e.g., a parking lot, a patio deck, a recreation area such as a swimming pool and nearby space) while area 145 spans an enclosed living space. Coverage area typically is spanned by a coverage radius that ranges from 20 to 100 meters. Confined coverage area 145 is generally associated with an indoor space such as a building, either residential (e.g., a house, a condominium, an apartment complex) or business (e.g., a library, a hospital, a retail store), which encompass a setting that can span about 5000 sq. ft.

A femto AP 130 typically serves a few (for example, 1-5) wireless devices (e.g., subscriber station 120B) within confined coverage area 125 via a wireless link 135 which encompasses a downlink (DL) and an uplink (UL). A femto network platform 109 can control such service, in addition to mobility handover from macro-to-femto handover and vice versa, and registration and provisioning of femto APs. Control, or management, is facilitated by backhaul link(s) 153 that connect deployed femto APs 130 with femto network platform 109. Backhaul pipe(s) 153 are substantially the same as backhaul link(s) 151. In an aspect of the subject innovation, part of the control effected by femto AP 130 measurements of radio link conditions and other performance metrics. Femto network platform 109 also includes components, e.g., nodes, gateways, and interfaces, that facilitates packet-switched (PS) (e.g., internet protocol (IP)) traffic and signaling generation for networked telecommunication. It should be appreciated that femto network platform 109 can be femto AP 130 can integrate seamlessly with substantially any packet switched (PS)-based and circuit switched (CS)-based network such as macro network platform 108. Thus, operation with a wireless device such as 120$_A$ is substantially straightforward and seamless when handover from femto-to-macro, or vice versa, takes place. As an example, femto AP 130 can integrate into an existing 3GPP Core Network via conventional interfaces, or reference links, such as Iu-CS, Iu-PS, Gi, or Gn.

It is to be noted that substantially all voice or data active sessions associated with subscribers within femto cell coverage (e.g., area 125) are terminated once the femto AP 130 is shut down; in case of data sessions, data can be recovered at least in part through a buffer (e.g., a memory) associated with a femto gateway at the femto network platform. Coverage of a suspended or hotlined subscriber station or associated account can be blocked over the air-interface. However, if a suspended or hotlined customer who owns a femto AP 130 is in Hotline/Suspend status, there is no substantive impact to the customers covered through the subject femto AP 130. In another aspect, femto AP 130 can exploit high-speed downlink packet access either via an interface with macro network platform 108 or through femto network platform 109 in order to accomplish substantive bitrates.

In addition, in yet another aspect, femto AP 130 has cell identifier(s) (e.g., a LAC (location area code) and RAC (routing area code)) that is different from the underlying macro network. It should be appreciated that in macro networks, cell identifiers (IDs) such as LAC and RAC are reused over several base stations, or Node Bs, and large areas so location information, or intelligence, accuracy and attachment procedure(s) (e.g., LAU or RAU) frequency are relatively low. It should be noted that based at least in part on radio technology deployment for macro networks, cell ID reuse granularity may differ, wherein radio technologies with distributed processing and more signaling capacity may afford more granular cell ID (e.g., LAC and RAC) assignments.

Femto LAC and RAC are used to identify subscriber station location for a variety of reasons, most notably to direct incoming voice and data traffic to appropriate paging transmitters, and emergency calls as well. As a subscriber station (e.g., UE 120$_A$) that exploits macro coverage (e.g., cell 105) enters femto coverage (e.g., area 125), the subscriber station (e.g., UE 120$_A$) attempts to attach to the femto AP 130 through transmission and reception of attachment signaling. The signaling is effected via DL/UL 135; in an aspect of the subject innovation, the attachment signaling can include a Location Area Update (LAU) and/or Routing Area Update (RAU). As an example of attachment procedure and mechanism(s) associated therewith, UMTS handsets monitor network pilots, e.g., generated through a femto cell, while in the idle mode; each pilot includes LAC and/or RAC. As a subscriber station moves between pilots, e.g., moves within a macro sector and reaches vicinity of a femto cell, the subscriber station probes for a change in LAC or RAC. When a change in LAC or RAC is detected, the subscriber station performs LAU and/or RAU so mobile network(s) becomes aware of subscriber station location in order to properly route incoming call pages. Attachment attempts are thus a part of procedures to ensure mobility, so voice calls and data sessions can be initiated even after a macro-to-femto transition or vice versa.

It is to be noted that UE $120_A$ can be employed seamlessly after either of the foregoing transitions. In addition, femto networks typically are designed to serve stationary or slow-moving traffic with reduced signaling loads compared to macro networks. A femto service provider network 165 (e.g., an entity that commercializes, deploys, or utilizes femto access point 130) is therefore inclined to minimize unnecessary LAU/RAU signaling activity at substantially any opportunity to do so, and through substantially any available means. It is to be noted that substantially any mitigation of unnecessary attachment signaling/control is advantageous for femto cell operation. Conversely, if not successful, UE $120_A$ is generally commanded (through a variety of communication means) to select another LAC/RAC or enter "emergency calls only" mode. It is to be appreciated that this attempt and handling process can occupy significant UE battery, and femto AP capacity and signaling resources (e.g., communication of pilot sequences) as well.

When an attachment attempt is successful, UE $120_A$ is allowed on femto cell 125, and incoming voice and data traffic are paged and routed to the subscriber through the femto AP 130. To facilitate voice and data routing, and control signaling as well, successful attachment can be recorded in a memory register, e.g., a Visited Location Register (VLR), or substantially any data structure stored in a network memory. It is to be noted also that packet communication (e.g., voice and data traffic, and signaling) typically paged/routed through a backhaul broadband wired network backbone 153 (e.g., optical fiber backbone, twisted-pair line, T1/E1 phone line(s), T3 phone line(s), digital level zero line (DS0), digital subscriber line (DSL) either synchronous or asynchronous, an asymmetric DSL, a coaxial cable . . . ). To this end, femto AP 130 is typically connected to the broadband backhaul network backbone 140 via a broadband modem (not shown). In an aspect of the subject innovation, femto AP 130 can display status indicators for power, active broadband/DSL connection, gateway connection, and generic or specific malfunction. In another aspect, no landline is necessary for femto AP 130 operation.

Figure 2:
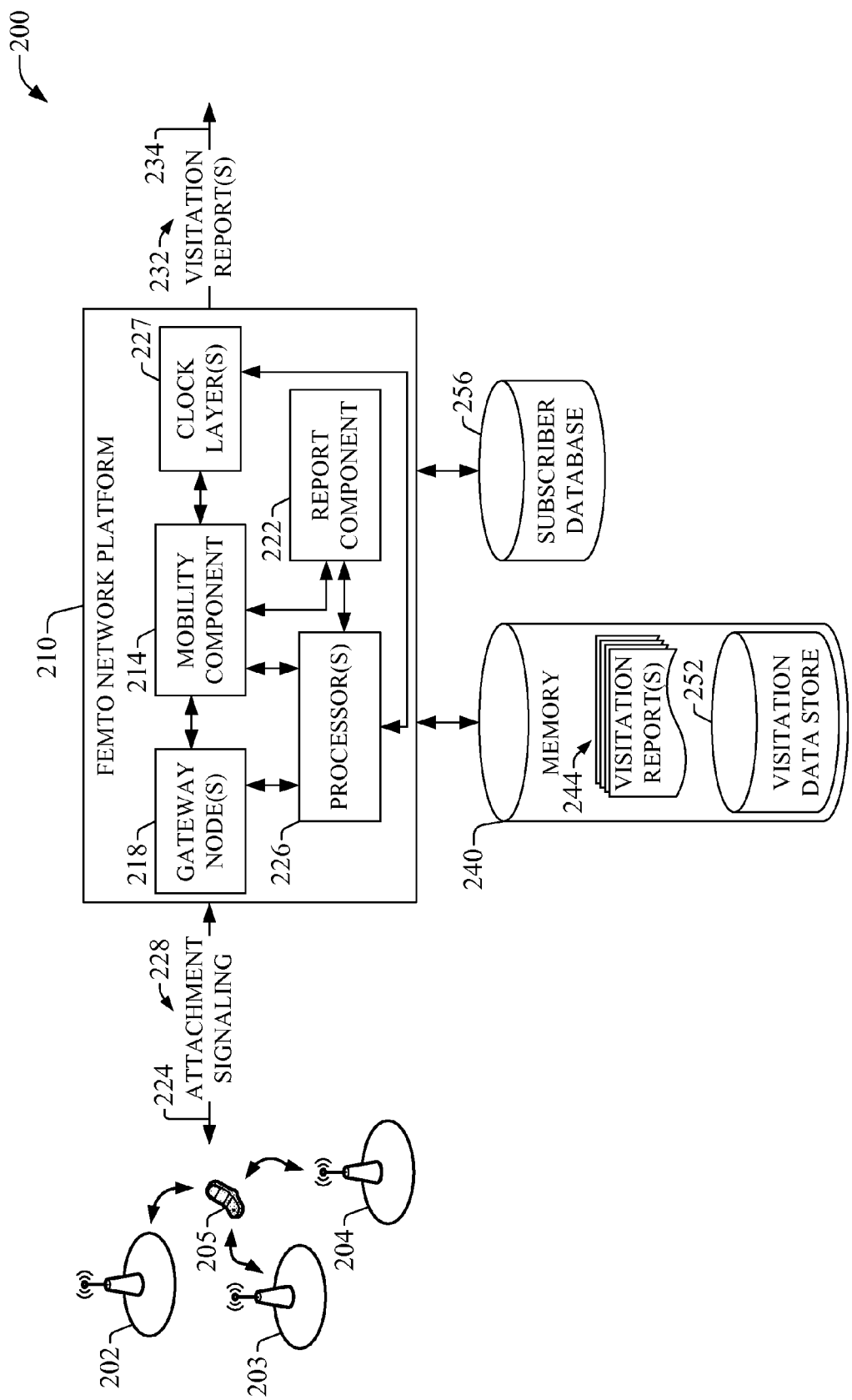
FIG. 2 is a block diagram of an example system that exploits femto cell visitation data to generate mobility history to identify real-time and historical location intelligence according to aspects described herein.

FIG. 2 is a block diagram of an example system 200 that exploits femto cell visitation data to generate mobility history to proactively identify real-time and historical location intelligence according to aspects described herein. Femto network platform 210 receives attachment signaling 228 associated with attachment procedure attempt(s), such as location area update (LAU) or routing area update (RAU)) attempts, that arise from mobile device 205 upon detection of femto pilot signal(s) delivered by a femto AP (e.g., one of femto AP 202-204). Such attachment attempt(s) occurs when mobile device 205 operates in idle mode in the proximity of the femto AP and detect at least one of location area code or routing area code difference, compared to macro. Attachment signaling 228 can reveal actual mobility scenarios associated with mobile device(s) within a deployed femto network, and include information on acceptance or rejection of attachment procedure attempts. It is to be noted that attachment procedure are asynchronous, and a single mobile device can attempt to attached to various femto cells, served via respective femto APs, located in disparate geographic areas; e.g., mobile device 205 can attempt to attach to femto cell 202, 203, or 204.

In an aspect, rejection or acceptance of an attempted attachment procedure (e.g., LAU or RAU), and ensuing allowance or rejection to camp on a femto AP that is the target of an attachment procedure, can be based at least in part upon whether mobile device 205 is included in access list(s) (not shown) that authorize coverage through the femto AP (e.g., one of femto APs that serve femto cells 202-205). Such access control procedure (e.g., LAU or RAU), despite its outcome, includes communication of international mobile subscriber identity (IMSI) between mobile 205 and femto network platform 210; it should be appreciated that such communication takes place through attachment signaling 224. In an aspect, gateway node(s) 218 receives attachment signaling 224 in relays it to mobility component 214, which receives the IMSI associated with mobile 205 in addition to information that indentifies the targeted femto AP (e.g., femto AP 202) such as, for example, at least one of LAC or RAC, as a part of mobility event(s). Moreover, mobility component 214, through clock system 227 (which can be embodied at least in part in one or more clock strata) can monitor a timeline for the mobility event(s), wherein the timeline can include timestamps and attachment timers. Thus, in mobility event(s), femto network platform 210 can identify at least one of which handset(s) attempts to attach to a specific femto AP, time(s) at which such attempt is conducted, or attachment timers that reveal a dwell time of a mobile device within a femto AP.

Mobility component 214 conveys identification information of mobile(s) and femto AP(s) in mobility event(s), and timestamp(s) associated therewith to report component 222 which can collect and process such information. It is noted that process can include at least one of analysis, formatting, filtering, aggregation, or the like. As part of processing collected identification information of mobile(s) and femto AP(s) and timestamp(s), report component 222 can generate, or supply, mobility reports, e.g., visitation report(s) 232, and retain and convey such visitation report(s) 234. In an aspect, visitation report(s) 232 can include, or be aggregated with, subscriber information, or intelligence, extracted from subscriber database 256; the subscriber information associated with either the mobile(s) that attempts attachment or the femto AP, or both. Mobility events can be reported on real time, or at specific time interval(s), e.g, several minutes, hours, or days. It is noted that as time progresses, several mobile devices, which can be identified, e.g., via IMSI linked thereto, can attempt to attach to several femto AP(s). At least a portion or the totality of the several mobile device-femto AP tuples generated in a visitation event(s) are retained, e.g., in visitation data store 252, and processed, e.g., counted, clustered, etc., for utilized in one or more of applications, location based or otherwise. Mobility reports can be retained in memory element visitation report(s) 244 within memory 240, and can be delivered through a wired or wireless network link 234.

Visitation report(s) 228 can include at least in part identification of mobile(s) and femto AP(s) involved in mobility events, or timelines associated therewith; as a non-limiting example, such visitation report(s) 228 can include an IMSI; femto AP location such as latitude and longitude, and a time of visitation event. Since a mobile device (e.g., mobile device 205) can attempt attachment to disparately located femto APs, information manipulated at least by report component 222 and included within visitation report(s) 228 can be utilized, e.g., as a powerful enabler, for location based services. In an aspect of the subject innovation, real-time or historical mobility report(s) can be provided, or delivered, to a location based service platform (not shown) for location based applications.

It is noted that at least three advantages of the subject innovation and, particularly, or example system 200, are that (i) it provides accurate subscriber location supplied with most any or any handset (e.g., mobile 205) that utilizes same radio technology as deployed femto cells (e.g., femto cells 202-204); (ii) additional handset receivers or transmitters (e.g., Wi-Fi or GPS transceiver(s)) or associated circuitry are not required; and (iii) signaling associated with location information from and to handset(s) is substantially mitigated with the ensuing handset battery draw reduction with respect to mechanism that generate location intelligence through substantive signaling. It is noted that at least advantage (i)-(iii) can expand the appeal and market share of location based services substantially beyond current limitation(s) imposed by handset hardware and traffic-dependent location reporting techniques or mechanisms.

In addition, with respect to advantage (ii) it is noted that conventional mechanism that provide location information such as Assisted Global Positioning System (AGPS) coordinate reporting and Wi-Fi access point reporting require dedicated hardware (e.g., AGPS receivers and Wi-Fi receivers) within mobile device in order to collect and deliver location information from the mobile device to a specific service provider. Inclusion of such dedicated hardware and associated application(s) add cost and complexity to the mobile device. Moreover, measurements associated with AGPS coordinate reporting and Wi-Fi access point reporting may be collected and reported by the mobile device according to a routine and timers associated therewith, or on-demand by a specific location based application. In contrast to features and aspect of the subject innovation, AGPS coordinate reporting and requires the mobile device to routinely activate AGPS receivers and wireless transmitters to collect and deliver location information. Likewise, Wi-Fi access point reporting requires mobile device to routinely activate a Wi-Fi receiver and wireless transmitter to collect and forward Wi-Fi SSID. Such activation process in these conventional mechanisms creates additional battery draw in the mobile device, and radio network traffic. In further contrast to the features of the subject innovation, such activation processes can be slowed in such a manner so as to detrimentally affect latency or accuracy. Further yet, in AGPS coordinate reporting, AGPS receiver and associated application(s) only operate when geopositioning satellites are visible, which generally does not occur very well indoors. In connection with Wi-Fi access point (AP) reporting, while in some cases Wi-Fi AP locations are known and may be useful for generation of location intelligence, not all Wi-Fi SSID locations are known.

With respect to advantage (iii), the subject innovation provides location intelligence with substantially less signaling and battery draw than conventional cellular sector ID reporting. In the latter conventional mechanism, while in a call (data session or voice), a mobile device can be prompted to convey serving macro cell ID, which has a location known to the network. Service macro cell ID may be collected and reported by the mobile device according to a routine and timers thereof, or on-demand by a specific location based application. However, unlike the mechanism described herein, conventional cellular ID reporting requires the mobile device to routinely make calls to collect and forward serving macro cell ID. Thus, such a process creates additional mobile device battery draw and radio network traffic. In further contrast to the features of the subject innovation, such process can be slowed in such a manner so as to affect latency or accuracy. Further yet, macro sectors are substantially larger than femto cells and thus resulting measurements as applied to location are substantially inaccurate.

Processor(s) 226 can be configured to confer, at least in part, functionality to components in example system 200, or execute one or more components, nodes, or layers therein. To at least such ends, processor(s) 226 can execute code instructions or program modules (not shown) stored in memory 240, and exploit related data structures (e.g., objects, classes).

Figure 3:
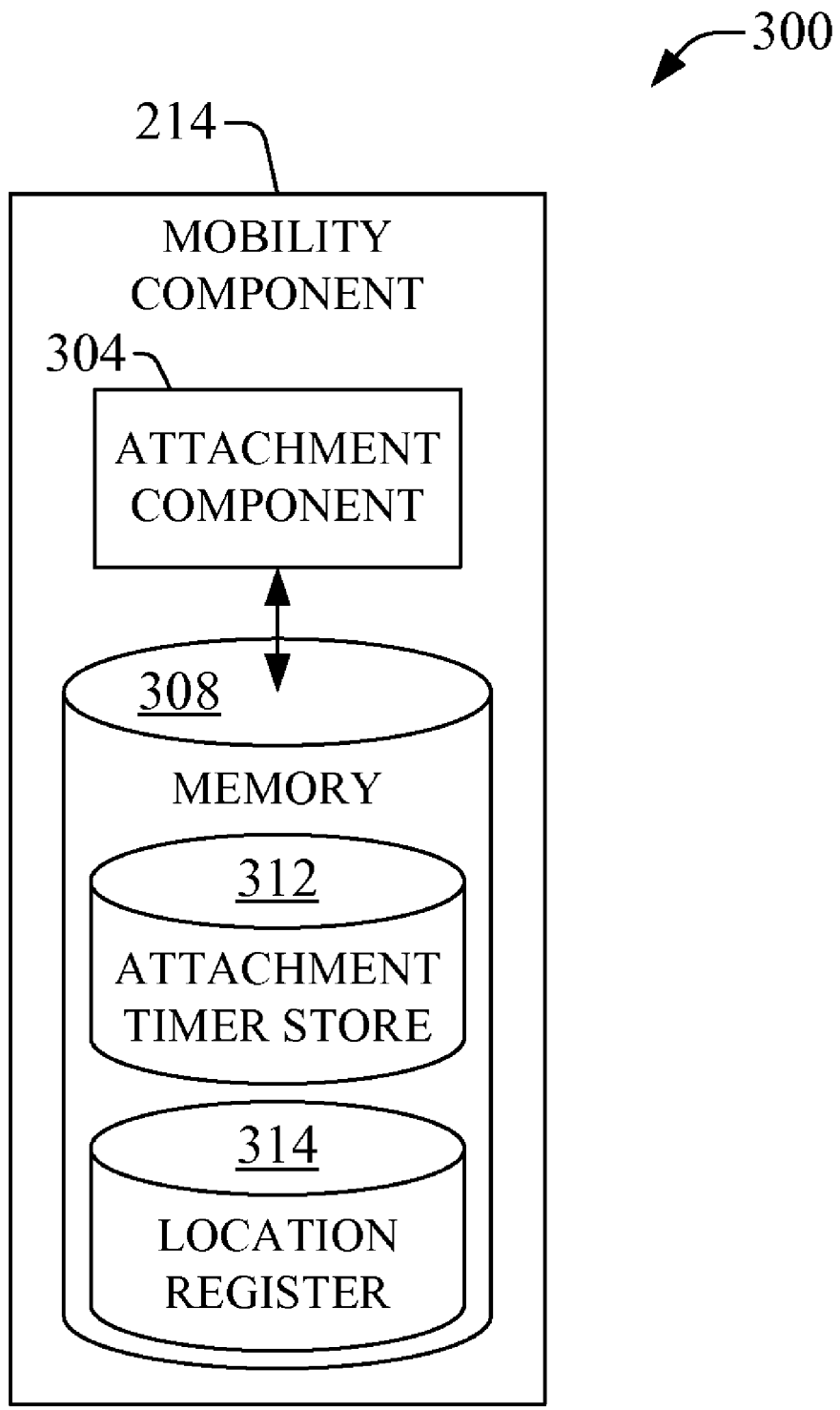
FIG. 3 illustrates a block diagram of an example embodiment of a mobility component that is part of an example system that collects, processes, and delivers femto visitation data in accordance with aspects described herein.

FIG. 3 illustrates a block diagram of an example embodiment 300 of a mobility component that is part of an example system that collects, processes, and delivers femto visitation data in accordance with aspects described herein. Mobility component 214 can include an attachment component 304 that can count or monitor the number of attachment procedures (e.g., LAU or RAU) associated with a mobile device and a femto access point identified at least in part through a specific LAC. In an aspect, as described above, authorization to attach to a femto AP can be granted through access list(s) that includes unique identifiers of respective mobile devices that can access femto coverage through a specific femto AP. When an attachment procedure is successful, mobility component 220 can (i) update location register 314 (e.g., home location register, visited location register, home agent memory . . . ) to reflect the new location of the mobile device; and (ii) trigger an attachment timer, e.g., via clock system 227 (not shown in FIG. 3) associated with the mobile device. When the mobile device detaches from the femto AP, attachment component 304 can stop the attachment timer, and record its magnitude in attachment timer store 312 within memory 308; location register also is updated. It is noted that while memory 308 is illustrated within mobility component 214, it can be a part of memory 240. It is further noted that attachment timers can determine dwell time, within a femto AP, of a mobile device that successfully attaches to the femto AP. In addition, attachment timers can facilitate, at least in part, generation of mobility patterns. In an aspect in connection with dwell time(s) determined by attachment timer(s), if a mobile device attempts attachment procedure(s) (e.g., LAU or RAU) with the same femto AP multiple times in a day, or substantially any predetermined time interval, the mobile device is likely stationary and frequently served, during various times equal to respective dwell times, or interfered by the femto AP. Such information can facilitate more focused determination of mobility profile(s) and transmission of location-based information, or intelligence, based upon at least in part where the mobile device is most.

Figure 4:
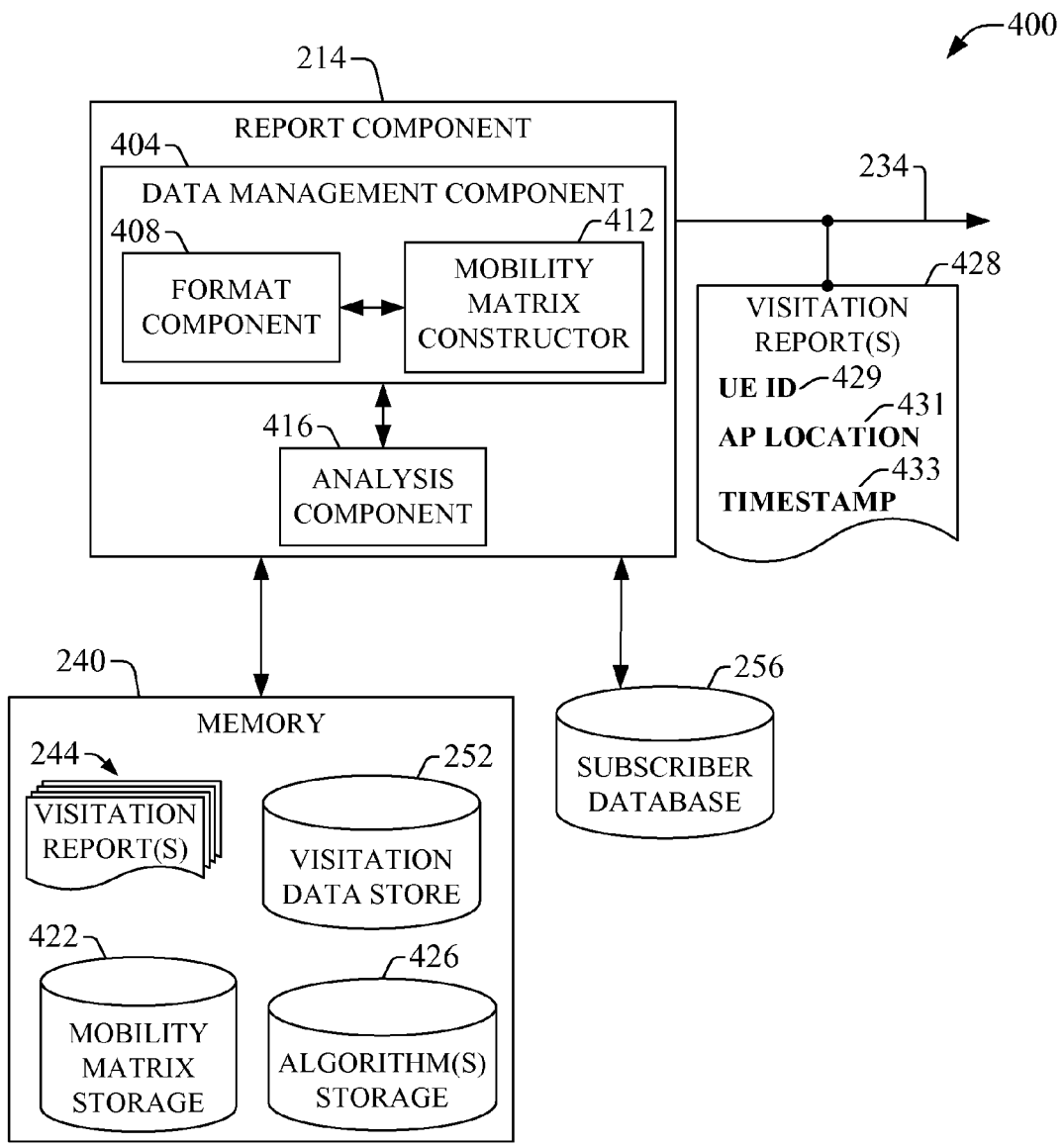
FIG. 4 illustrates a block diagram of an example embodiment of a report component that is part of an example system that collects, processes, and delivers femto visitation data in accordance with aspects described herein.

FIG. 4 illustrates a block diagram of an example embodiment 400 of a report component that is part of an example system that collects, processes, and delivers femto visitation data in accordance with aspects described herein. In addition to generation of real-time visitation report(s) 428 which can include a UE identifier (ID) 429, a femto AP location 431, and a timestamp 433, data management component 404 can generate mobility report(s) based at least in part on historical visitation data and analysis thereof. It is noted that UE ID 429 can be an IMSI, electronic serial number (ESN), mobile equipment identifier (MEID), mobile directory number (MDN), or the like. It is further noted that femto AP location can be provided as at least one of a geocode and associated geographic coordinates such as latitude and longitude, or latitude, longitude, and altitude; a street address; a parcel record; a ZIP code; or the like. To process real-time and historical visitation data generated through attachment signaling 228, and deliver associated mobility report(s), e.g., visitation report(s) 232, report component 214 includes a data management component 404 that gathers data from visitation data store 252 and supplies the data for analysis thereof. Data management component 404 includes a format component 408 that can compose substantially any, or any, mobility report(s), e.g., real-time report(s) or historical report(s). It is to be noted that format component 408 can cast visitation report(s) 232 in accordance with one or more of various schemas, such as hypertext markup language (HTML) and extensible markup language (XML) and variants (e.g., state chart XML (SCXML)), that are portable among computing platforms, wireless (e.g., a portable computer or mobile device) or otherwise, and object-oriented computing languages employed by a wireless device such as Delphi, Visual Basic, Python, Perl, Java, C++, and C#, and circuitry programming level languages such as Verilog. In addition, format component 408 can cast visitation data into various formats to facilitate analysis thereof and related reporting.

To supply visitation data for analysis, data management component 404 can utilize format component 408 to aggregate visitation data over one or more time interval configured by data management component 404 in order to generate record(s) of historical visitation data. Aggregation of femto visitation data also can include information record(s) linked to a specific subscriber or subscriber groups (e.g., customer segments, groups of subscribers included in one or more related access lists . . . ) associated with one or more handsets for which visitation data is available. In addition, format component 408 can compress visitation data for efficient storage in visitation data store 252 or manipulation by analysis component 416; compressed data can be decompressed when data management component 404 is polled, for example, by analysis component 416. In an aspect, compression can be implemented through wavelet-based algorithm(s) which can be stored in algorithm(s) storage 426.

In an aspect, format component 408 can utilize a mobility matrix constructor 412 that is included in data management component 404. Mobility matrix constructor 412 can generate one or more matrices that can reveal relationship(s) among subscriber station(s) mobility and deployed femto access points in a femto network. A mobility matrix can be constructed through enumeration of visits, or visit attempts, from a specific handset to a specific femto AP. Such enumeration can be implemented through visitation data retained in visitation data store 252. A mobility matrix element is set equal to the number of attempts to attach to a specific femto AP effected by a mobile device. In an aspect, matrix constructor can generate a mobility matrix indexed via mobile device ID in rows, and femto AP ID in columns. Alternatively or in addition, a mobility matrix can be indexed through AP ID in rows and UE ID in columns. With respect to structure, a mobility matrix has integer matrix elements, and it generally is a sparse matrix; each mobile device in a set of mobile device does not visit each femto AP in a set of deployed femto APs utilized, in part, to generate a mobility matrix. Mobility matrices can be retained in mobility matrix storage 422; it is noted that the generally sparse structure of mobility matrices facilitate efficient storage.

For a set of mobile devices and femto AP, it should be appreciated that matrix elements in a mobility matrix become increasingly more accurate as the number of attachment procedure (e.g., LAU or RAU) attempts increase. Such increase is based at least in part on the increase in the magnitude of matrix elements that reflect frequent visitation attempts increases with respect to those matrix elements that link mobile devices and femto AP that are rarely in close proximity so as to result in attachment attempt. As the number of femto APs increases, mobility matrices become increasingly more powerful as an instrument to report and facility location intelligence. It is noted that mobility matrices incorporate non-random mobility features associated with actual visitation of deployed femto APs by a mobile device that travels a femto network deployment.

As part of visitation data process, analysis component 416 can operate on the formatted data to at least one of compute statistics (e.g., mean values, variances, covariance matrices . . . ), extract patterns of mobility or visitation data clusters with specific features, infer visitation event(s), in order to facilitate provision of visitation data that can be exploited by location based services. It is noted that patterns of mobility or compilation(s) of historical mobility profile can facilitate non-real-time location services; as an example, generation of a mobility pattern for a parent that regularly takes his or her child(ren) to after-school activity(ies) can facilitate a location service platform to supply various alternative driving direction(s) to ensure most efficient route(s) from a parent's starting location to the location of the after-school activity(ies). With respect to specific features of visitation data cluster, such features can include a specific mobile device; a specific group of mobile devices; a specific femto AP or group of femto APs; a specific time of day (e.g., rush hour(s), or evening(s)), week (e.g., weekend), or month (e.g., first Monday of month); or the like. Analysis component 416 also can correlate visitation data with subscriber intelligence (e.g., customer segment(s)) available through subscriber database 256; it is noted that such correlation can provide a wealth of information relevant to marketing efforts associated with at least one of a network operator or a location based services provider. Moreover, analysis component 416 can exploit visitation history, or visitation data, particularly recorded instances of attachment times, or dwell times, to identify areas with weak macro coverage and/or areas where transmission form femto AP(s) is potentially contributing significant interference. Such visitation history information can be exploited to (a) pinpoint new cell growth or identify one or (b) more femto APs that can operate best if allowed to be open and not access restricted; open access can be attained through access list(s) that allow attachment from any device operated through a network service provider that operated the one or more femto APs. In utilization scenario (b), analysis component 416 can autonomously determine, e.g., through cost-utility analysis implemented via machine learning techniques, that a femto access point is to be configured as "open;" such determination can be based at least in part on statistics of attachment procedures, as revealed via visitation data, that indicate a substantive number of provisioned mobile devices interact with the femto AP determined to be configured as open. It is noted that open femto APs can be utilized as a server (in open configuration) rather than as an interferer (in closed configuration with access dictated through access list(s)). It is noted that to avoid privacy issues associated with configuration of home-based femto APs as open femto APs, network operator can deploy "system" or "network" femto APs rather than home-based femto APs to serve as server or relay stations, which can mitigate interference, enhance macro, and promote network resource offloading without potential risks to content(s) or integrity of home-based femto APs. To conduct various analyses, analysis component 416 employs one or more algorithms retained in algorithm(s) storage 422. In addition, analysis component 416 can exploit one or more processors such as processor(s) 226 to carry out, at least in part, the analysis.

As employed herein, to infer refers to reason and draw a conclusion based upon a set of metrics, arguments, or known outcomes in controlled scenarios. Thus, to infer forthcoming visitation event(s), analysis component 416 can exploit artificial intelligence (AI) methods or machine learning methods. Artificial intelligence techniques typically apply advanced mathematical algorithms—e.g., decision trees, neural networks, regression analysis, principal component analysis (PCA) for feature and pattern extraction, cluster analysis, genetic algorithm, or reinforced learning—to a data set; e.g., a visitation data set such as mobility matrices.

In particular, analysis component 416 can employ one of numerous methodologies for learning from data and then drawing inferences from the models so constructed. In an aspect, the methodologies can be retained, at least in part, on algorithm(s) storage 426. For example, Hidden Markov Models (HMMs) and related prototypical dependency models can be employed. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed.

Figure 5:
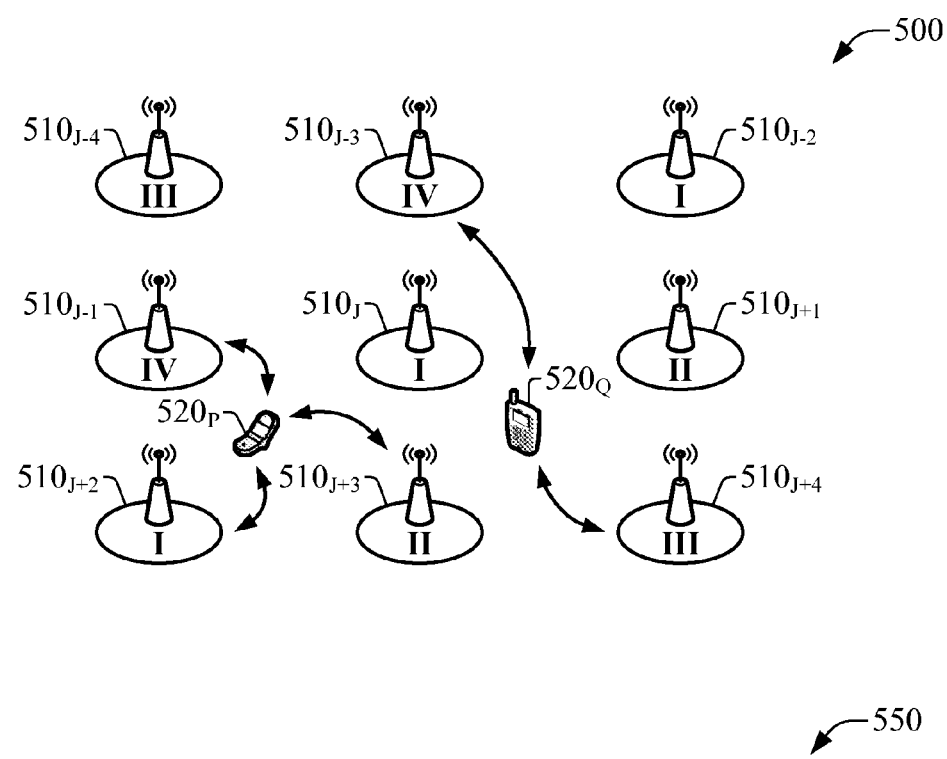
FIG. 5 illustrates diagrams of a set of femto access points and subscriber stations, and an example mobility matrix, respectively, in accordance with aspects described herein.

FIG. 5 illustrates diagrams 500 and 550 of a set of femto access points and subscriber stations, and an example mobility matrix, respectively, in accordance with aspects described herein. With respect to diagram 500, nine femto APs $510_{J-4}$-$510_{J+4}$, with J a natural number greater than four, embody a set of femto APs to which mobile devices, e.g., UE $520_P$ and UE $530_Q$, can attempt to attach. Femto APs $510_{J-4}$-$510_{J+4}$ are located in disparate geographic loci, and assigned location area codes, indicated through roman numerals I-IV, with a specific illustrative reuse plan. Subscriber stations 520P and 520Q embody and illustrative example set of mobile devices that can travel throughout at least a portion of the set of femto AP $510_{J-4}$-$510_{J+4}$ and attempt attachment thereto; such attachment attempts facilitate generation of visitation data and one or more related mobility matrices. Each of the subscriber stations $520_P$ and $520_Q$ has a unique device identifier (e.g., an IMSI, a ESN, a MEID, an MDN . . . ). As described above, attempts to from a subscriber station, e.g., $520_P$ or $520_Q$, to attach to one or more of femto APs $510_{J-4}$-$510_{J+4}$ result in respective counts, e.g., $M_{Q,\kappa}$, with $\kappa$=J-4, J-3, . . . , J+3, J+4, or $M_{P,\kappa}$, which can be employed to define a mobile matrix such as the one illustrated in diagram 550. In an aspect, one or more network components, e.g., data management component 404 through mobility matrix constructor can produce example mobility matrix 550. To further illustrate mobility matrix 550, it is noted that specific mobility patterns of a mobile device can results to several mobility matrix elements being zero: In diagram 550, arrows that connect subscriber station $520_P$ and femto AP $510_{J-1}$, $510_{J-2}$ and $510_{J-3}$ can reveal a mobility patter for such subscriber station, which can lead to mobility matrix elements $M_{P,J-1}$, $M_{P,J+2}$, and $M_{P,J-3}$ being non-zero elements, whereas the remainder matrix elements associated with subscriber station $520_P$ are zero. Likewise, for subscriber station $520_Q$, mobility pattern thereof as revealed through arrows associated therewith, can result in only matrix elements $M_{Q,J-3}$ and $M_{Q,J+4}$ being non zero. Accordingly, an example mobility matrix related to illustrated example mobility patterns can be a sparse matrix.

Figure 6:
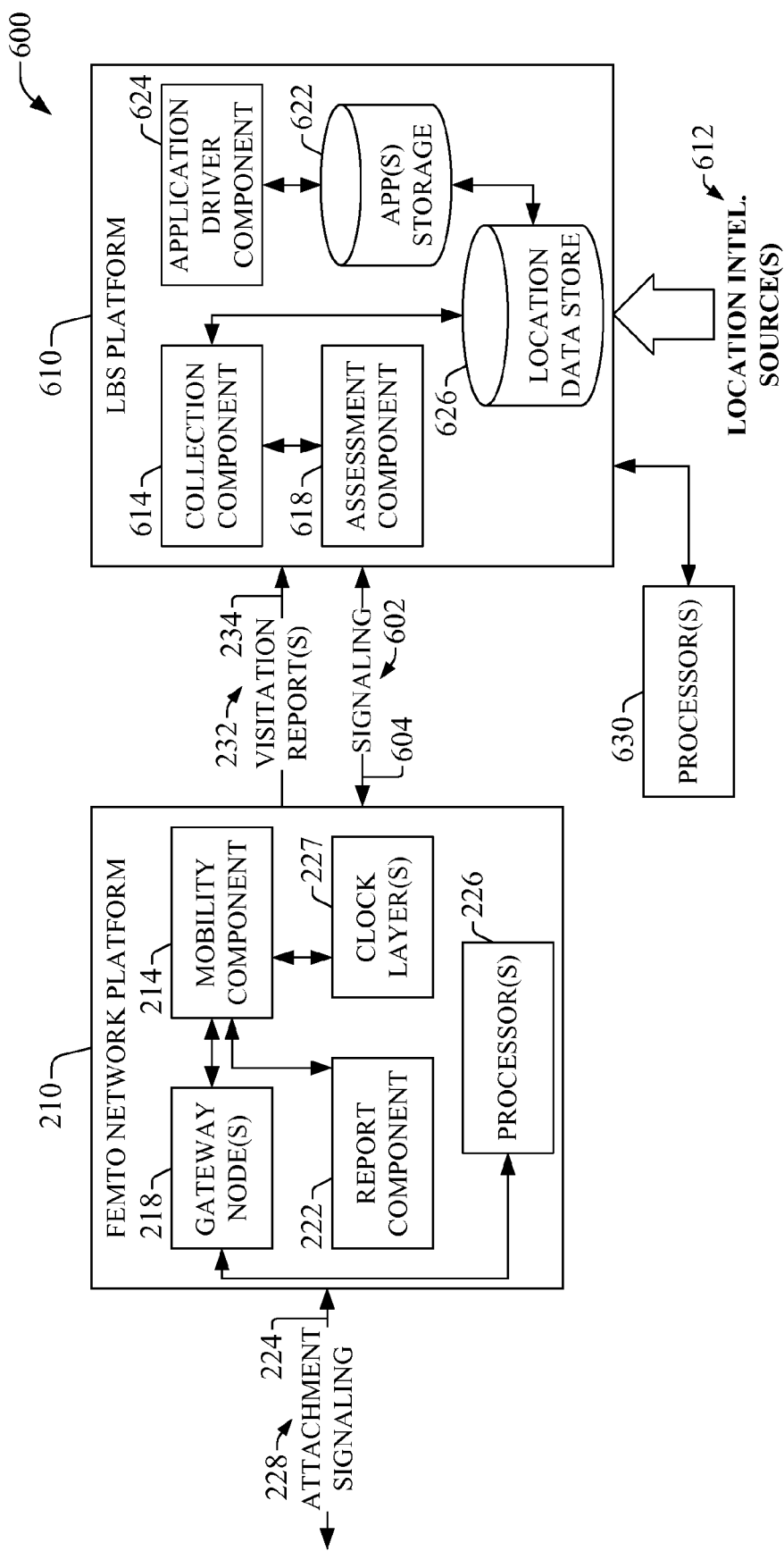
FIG. 6 is a block diagram of an example system that exploit visitation report(s) for location based services in accordance with aspects described herein.

FIG. 6 is a block diagram of an example system 600 that exploits visitation report(s) for location based services in accordance with aspects described herein. Location based services (LBS) platform 610 receives visitation report(s) 232 as a source of location intelligence. Through signaling 602, LBS platform 610 can request, or determine, specific content in or format of visitation report(s) 232; as an example signaling 602 can be conveyed by collection component 614, and can request real-time reports or historical reports. In an aspect, signaling 602 can be received through gateway node (s) 218 and processed via report component 222; signaling can be embodied in one or more bits delivered through a management packet via network link 604 (e.g., a reference link). As described above, visitation report(s) 232 convey location information associated with one or more specific handset identifiers (e.g., IMSI, ESN, MEID, MDN). In addition, in an aspect of the subject innovation, LBS platform 610 collects location information form a set of disparate location intelligence source(s) 612; e.g., GPS data, data gathered from Wi-Fi network(s) and access points therein, macro cell ID, or radio frequency identification (RFID) tags. It is noted that location intelligence form disparate source(s) 612 also can be specific to one or more UE identifiers. In an aspect, LBS platform 612 can be a part of service network(s) (NWs) that provides data to femto network platform 210, and related macro network platform. Visitation report(s) 232 and data from the other source(s) of location intelligence 612 can be received via collection component 614. Received location intelligence can be retained in location data store 626.

Before utilizing location intelligence based at least in part on at least one of (i) real-time or historical mobility report(s), e.g., visitation report(s) 232, or (ii) location intelligence from disparate source(s), e.g., location intelligence source(s) 612, LBS platform 610, trough assessment component 618, can assess or identify which portion(s) of location information is most accurate, timely, and suitable for each combination of reported mobile device (e.g., a reported IMSI, ESN, MEID, MDN, etc.) and location based service or application. In an example scenario, femto cell visitation event(s) or associated history can be more accurate and timely than Wi-Fi-based information, or macro cell ID information, but if newer GPS (e.g., assisted GPS) location information becomes available, assessment component 618 can assign precedence to such GPS information for real-time applications. In another example scenario, historical mobility report(s), e.g., visitation report(s) 232, can provision historical location information useful for other non-real-time services for the subscriber. Such historical location information can be mobility profile for one or more handsets; the profile can span a predetermined time interval determined by LBS platform 610 through signaling 602.

Based at least upon the timing or content of location information as provided through visitation report(s) 232 or other location intelligence source(s) 612, LBS platform 610 can elect to effectuate immediate, or substantially immediate, action for a reported handset such as deliver advertisement(s) or other marketing and branding element(s) (e.g., coupons); compose a handset-location (e.g., an IMSI-geocode) database for on-demand application(s) or service(s) such as search or directory services; or construct a historical mobility profile for pattern-specific location services such as optimal or nearly-optimal driving directions provisioning. Applications or services that exploit location intelligence received through visitation report(s) or location intelligence source(s) 612 can be effected at least in part through one or more applications retained in application(s) store 622; in an aspect, application driver component 624 can execute, at least in part, the one or more applications.

In example system 600, one or more processors 630 functionally coupled to LBS platform 610 can be configured to confer, at least in part, functionality to components therein. The one or more processors 630 also can execute one or more components that reside within LBS platform 610. To at least such ends, the one or more processors 630 can execute code instructions or program modules (not shown) stored in a memory (not shown) functionally coupled to LBS platform 610.

In view of the example systems described above, example methodologies, or methods, that can be implemented in accordance with the disclosed subject matter can be better appreciated with reference to flowcharts in FIGS. 7-11. For purposes of simplicity of explanation, example methodologies disclosed herein are presented and described as a series of acts; however, it is to be understood and appreciated that the claimed subject matter is not limited by the order of acts, as some acts may occur in different orders and/or concurrently with other acts from that shown and described herein. For example, a methodology disclosed herein could alternatively be represented as a series of interrelated states or events, such as in a state diagram or call flow. Moreover, interaction diagram(s) may represent methodologies in accordance with the disclosed subject matter when disparate entities enact disparate portions of the methodologies. Furthermore, not all illustrated acts may be required to implement a methodology in accordance with the subject specification. Further yet, two or more of the disclosed methodologies can be implemented in combination with each other, to accomplish one or more features or advantages herein described. It should be still further appreciated that the methodologies disclosed hereinafter and throughout this specification are capable of being stored on an article of manufacture to facilitate transporting and transferring such methodologies, or methods, to computers for execution, and thus implementation, by a processor or for storage in a memory.

Figure 7:
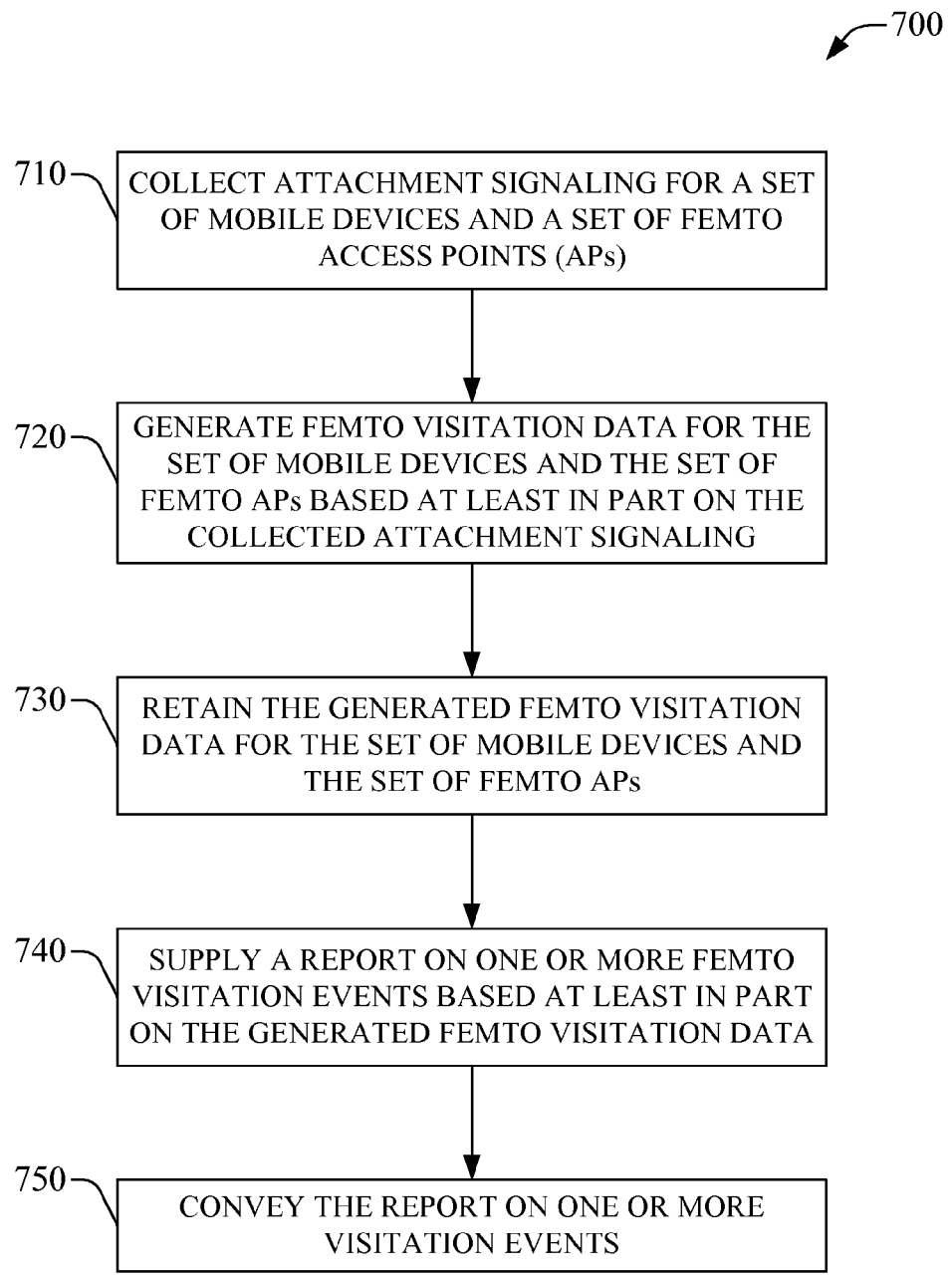
FIG. 7 is a flowchart of an example method for collecting attachment signaling associated with attachment procedure(s) to one or more femto cells, and forwarding femto visitation data according to aspects described herein.

FIG. 7 is a flowchart of an example method 700 for collecting attachment signaling associated with attachment procedure(s) to one or more femto cells, and forwarding femto visitation data according to aspects described herein. In an aspect, the subject example method can be effected through at least a portion of a mobile network (e.g., femto network platform 210), or one or more components therein. In addition, one or more processors (e.g., processor(s) 226) that confer, at least in part, functionality to the one or components can enact, at least in part, the subject example method 700. At act 710, attachment signaling for a set of mobile devices and a set of femto access points is collected. Each femto AP within the set of femto APs is provisioned to provide femto coverage. In an aspect, attachment signaling originates from mobility events associated with a mobile device that travels throughout the set of femto access points. In addition, attachment signaling can be part of at least one of LAU or RAU procedures which can occurs when one or more of the handsets in the set of handsets operate in idle mode in the vicinity of a femto AP, and detect pilot signals originated there from. It is noted that each of the set of mobile devices and femto APs can include one or more elements.

At act 720, femto visitation data for a set of mobile devices and a set of femto access points generated based at least in part on the collected attachment signaling. The visitation data can be generated through a component that manages macro-to-femto handover or femto-to-macro handover (e.g., mobility component 220); the component enacts, at least in part, the subject example method 700. The femto visitation data can include a handset identifier (e.g., an IMSI, MEID, or ESN), a femto AP location such as latitude and longitude coordinates or geocode associated therewith, a ZIP code, a parcel identifier, a street address, or the like. At act 730, the generated femto visitation data for the set of mobile devices and the set of femto access points is retained. In an aspect such data is retained in a memory within the one or more mobile network components that can enact the subject example method 700; see FIG. 2. At act 740, a report on one or more visitation events extracted at least in part from the generated visitation data is supplied. In an aspect, the report can be generated in real time or can include historical data that spans a predetermined time interval. The predetermined time interval can be configurable and can be established by a component (e.g., mobility component 214) that enacts, at least in part, the subject example method. The supplied report can adopt several formats such as at least one of a three-tuple comprising a user equipment (UE) ID, a femto AP location, and a timestamp; a mobility matrix; a mobility profile or pattern; or the like. It is noted that the supplied report (e.g., visitation report (s) 232) can be formatted in accordance with one or more of various schemas, such as hypertext markup language (HTML) and extensible markup language (XML) and variants (e.g., state chart XML (SCXML)), that are portable among computing platforms, wireless (e.g., a server, a portable computer or mobile device) or otherwise, and object-oriented computing languages employed by a wireless device such as Delphi, Visual Basic, Python, Perl, Java, C++, and C#, and circuitry programming level languages such as Verilog. It is noted that the report can be supplied in response to received signaling from an entity that can consume location intelligence within the supplied report. Received signaling also can dictate at least in part the format of the supplied report. At act 750, the report on one or more visitation events is conveyed. In an aspect, the report is delivered to a location based services platform for consumption in one or more applications, which can be real-time or historical applications.

Figure 8:
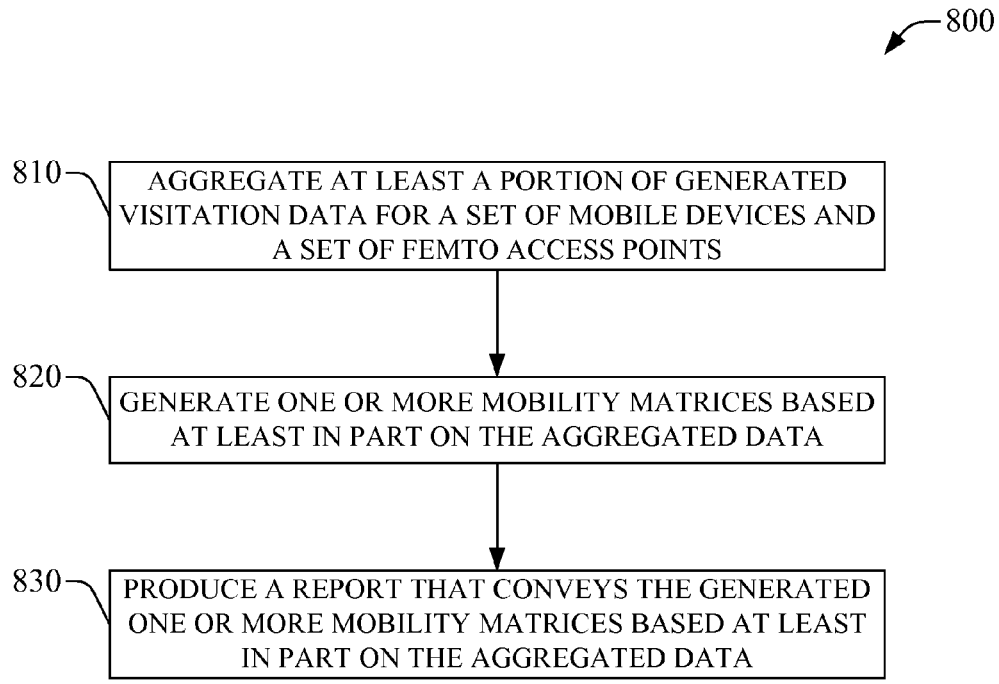
FIG. 8 presents a flowchart of an example method for supplying a report on visitation data according to aspects described herein.

FIG. 8 presents a flowchart of an example method 800 for supplying a report on visitation data according to aspects described herein. In an aspect, the subject example method can be effected through at least a portion of a mobile network (e.g., femto network platform 210), or one or more components therein. In addition, one or more processors (e.g., processor(s) 226) that confer, at least in part, functionality to the one or components can enact, at least in part, the subject example method 800. At act 810, at least a portion of generated visitation data for a set of mobile devices and a set of femto access points is aggregated. Data is aggregated over a configurable time interval that can be determined by a network operator or it can be submitted by a consumer of the visitation data (e.g., location based services platform 610). In an aspect, the set of mobile devices can include one or more elements. As an example, aggregation at the single device level can facilitate monitoring location of a specific device. As another example, a set of devices linked to a group of related subscriber also can be aggregated and thus monitored. It should be appreciated that aggregation of visitation data and reporting thereof can facilitate provision of non-realtime location services, when the aggregated visitation data is reported to a location based service platform. At act 820, one or more mobility matrices (see FIG. 5) are generated based at least in part on the aggregated data. At act 830, a report that conveys the generated one or more mobility matrices based at least in part on the aggregated data is produced. In an aspect, report component 214 can produce the report.

Figure 9:
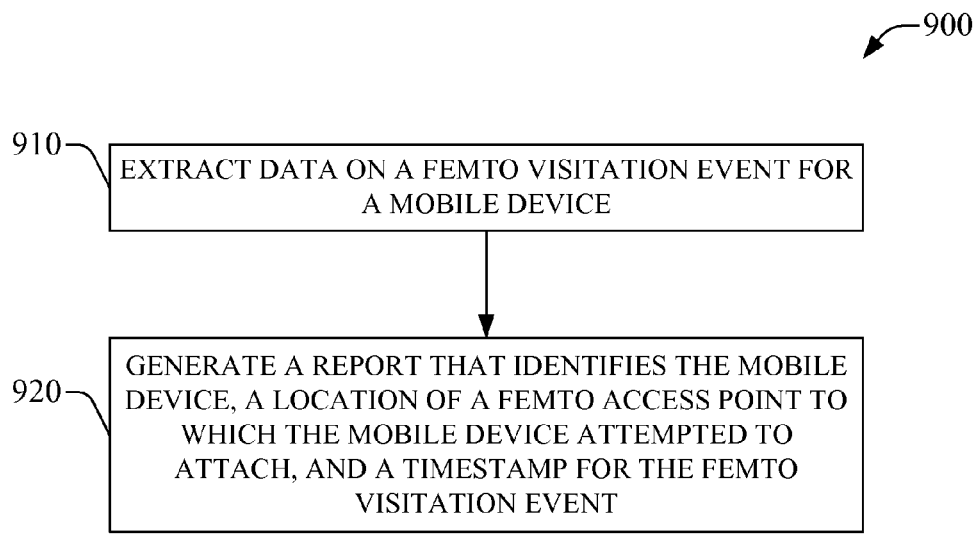
FIG. 9 is a flowchart of an example method for supplying a report on visitation data according to aspects described herein.

FIG. 9 is a flowchart of an example method 900 for supplying a report on visitation data according to aspects described herein. It is noted that the subject example method 900 supplies a real-time report of femto visitation data. In an aspect, the subject example method can be effected through at least a portion of a mobile network (e.g., femto network platform 210), or one or more components therein. In addition, one or more processors (e.g., processor(s) 226) that confer, at least in part, functionality to the one or components can enact, at least in part, the subject example method 900. At act 910, data on a femto visitation event for a mobile device is extracted. At act 920, a report is generated that identifies the mobile device, a location of a femto access point to which the mobile device attempted to attach, and timestamp for the femto visitation event. Location of the femto AP can be identified and conveyed via a code assigned at the time of provisioning the femto AP.

Figure 10:
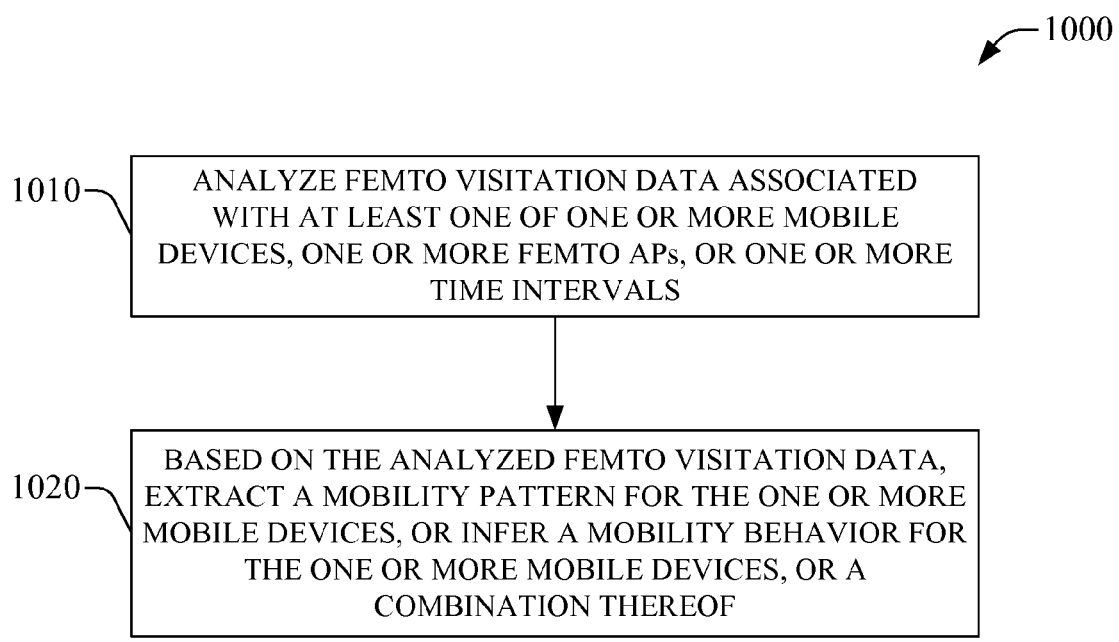
FIG. 10 presents a flowchart of an example method for supplying a report on visitation data according to aspects described herein.

FIG. 10 presents a flowchart of an example method 1000 for supplying a report on visitation data according to aspects described herein. In an aspect, the subject example method can be effected through at least a portion of a mobile network (e.g., femto network platform 210), or one or more components therein. In addition, one or more processors (e.g., processor(s) 226) that confer, at least in part, functionality to the one or components can enact, at least in part, the subject example method 1000. At act 1010, femto visitation data associated with at least one of one or more mobile devices, one or more femto APs, or one or more time intervals is analyzed. Analysis can include at least one of generating time and space correlations among the one or more mobile devices and the one or more femto APs; cluster identification of mobility events in space and time, the mobility events gleaned from the femto visitation data; computation of statistics associated with mobility events; or the like. At act 1020, based on the analyzed femto visitation data, a mobility pattern for the one or more mobile devices is extracted, or a mobility behavior is inferred for the one or more mobile devices, or a combination thereof is effected.

Figure 11:
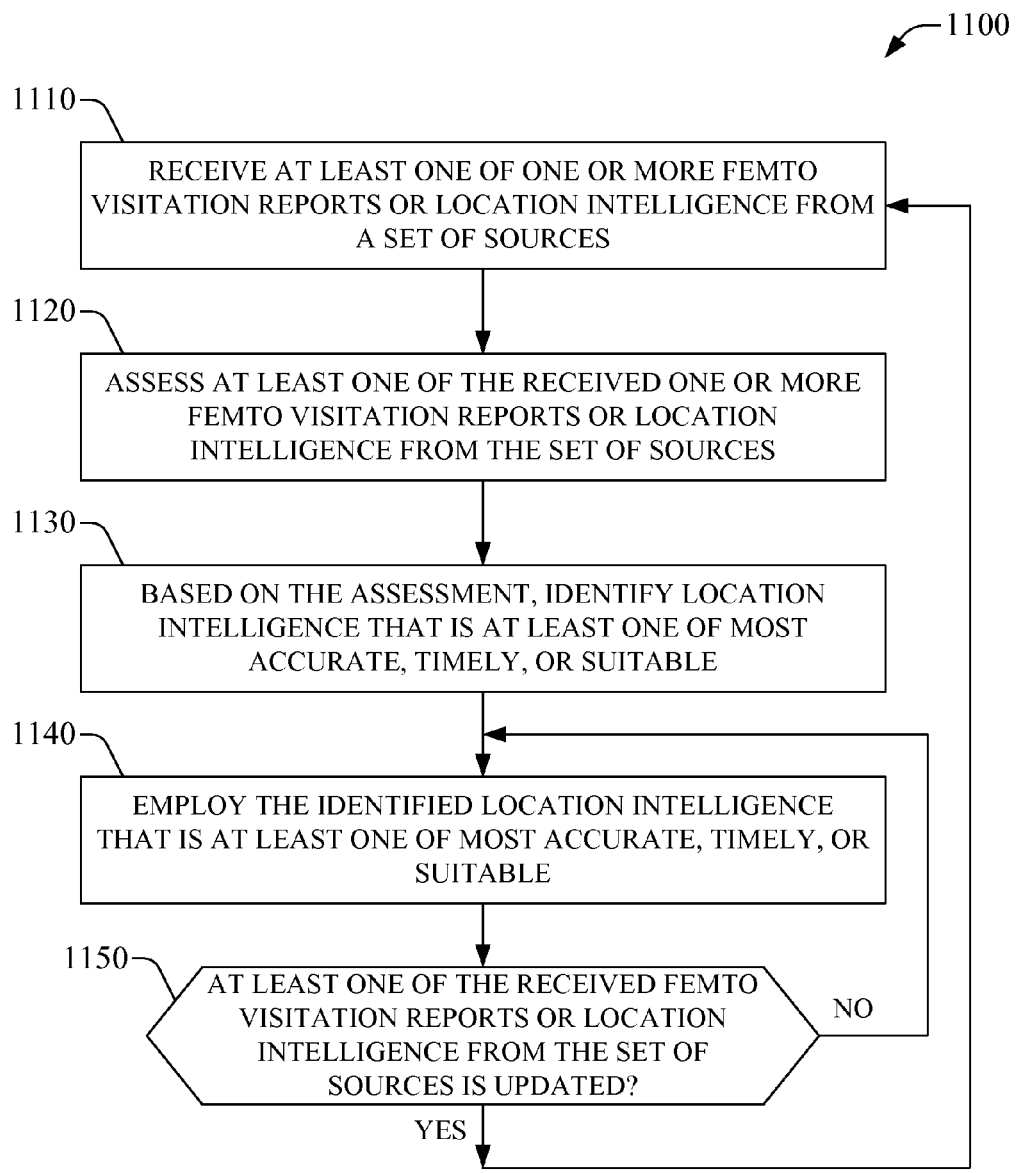
FIG. 11 is a flowchart of an example method for exploiting location information extracted from femto visitation data according to aspects described herein.

FIG. 11 is a flowchart of an example method 1100 for exploiting location information extracted from femto visitation data according to aspects described herein. In an aspect, a location based service provider (e.g., LBS component 610) can effectuate, at least in part, the subject example method 1100. A processor that confers, at least in part, functionality to one or more component within the location based service provider also can enact, at least in part, the subject example method 1100. At act 1110, at least one of one or more femto visitation reports or location intelligence from a set of sources is received; it is noted that the set of sources can include one or more entities. At act 1120, at least one of the received one or more femto visitation reports or location intelligence from the set of sources is assessed. At act 1130, based on the assessment, location intelligence that is at least one of most accurate relative to disparate sources in the set of sources, timely, or suitable is identified. At act 1140, the identified location intelligence that is at least one of the most accurate relative to disparate sources in the set of sources, timely, or suitable is employed. In an aspect, location intelligence is employed by the location service provide that can enact, at least in part, the subject example method 1100. At act 1150, it is checked whether at least one of femto visitation report(s) or location intelligence is updated. In an aspect, update(s) can be probed by monitoring signaling received from one or more component that generate femto visitation data reports. In another aspects, source of location intelligence also can be monitored. When the outcome of act 1150 is affirmative, flow is directed to act 1110. Conversely, when outcome of act 1150 is negative, flow is directed to act 1140.

Figure 12:
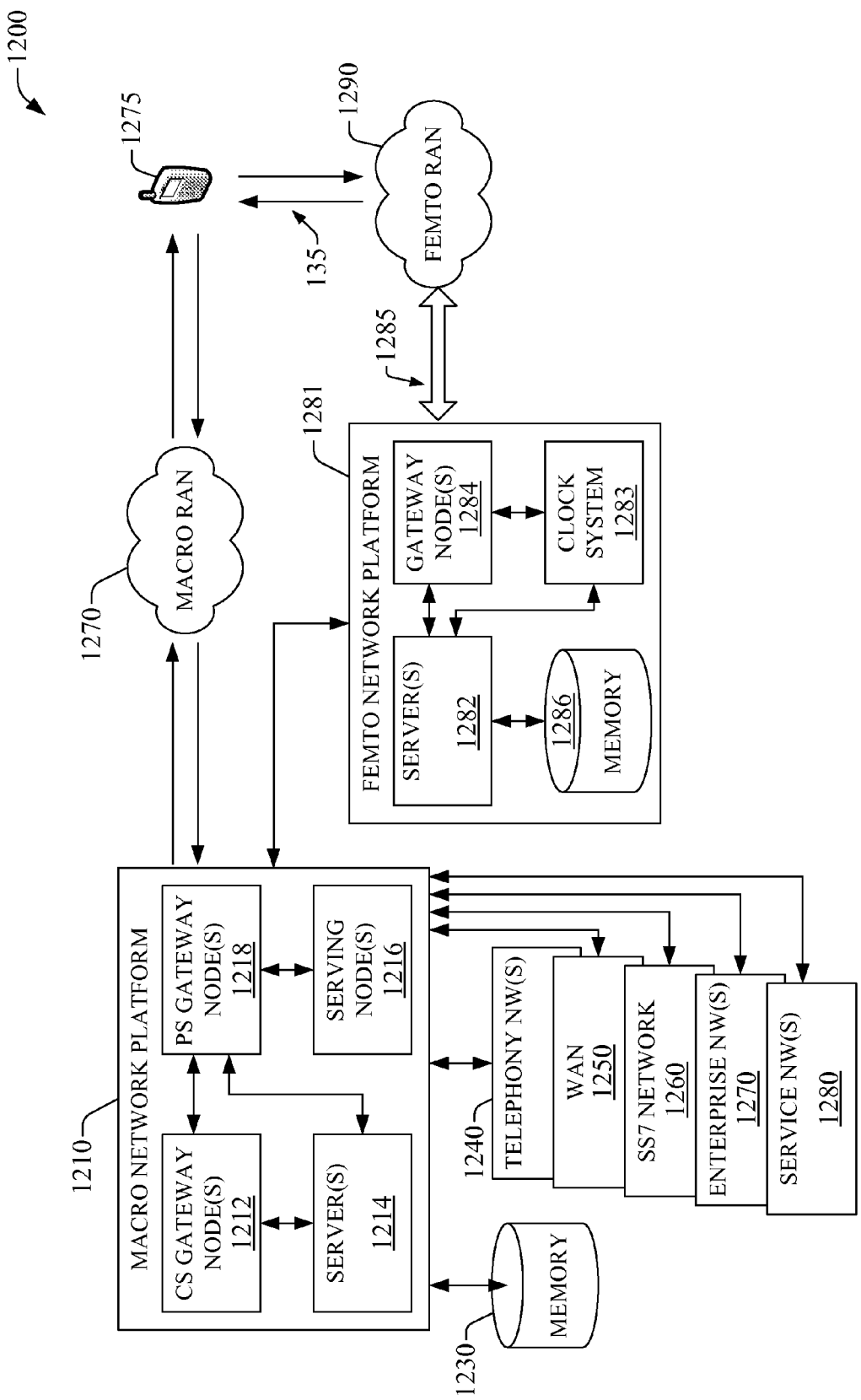
FIG. 12 illustrates example macro and femto wireless network environments that can exploit femto APs that utilize aspects of the subject innovation.

To provide further context for various aspects of the subject specification, FIG. 12 illustrates a block diagram of an example macro and femto wireless network environments that can exploit attachment signaling and derived real-time or historical visitation data for location intelligence in accordance with various aspects described herein. Wireless communication environment 1200 includes two wireless network platforms: (i) A macro network platform 1210 which serves, or facilitates communication with user equipment 1275 (e.g., mobile 120_A) via a macro radio access network (RAN) 1270. It should be appreciated that in cellular wireless technologies (e.g., 3GPP UMTS, HSPA, 3GPP LTE, 3GPP2 UMB), macro network platform 1210 is embodied in a Core Network. (ii) A femto network platform 1280, which can provide communication with UE 1275 through a femto RAN 1290, which is linked to the femto network platform 1280 via backhaul pipe(s) 1285 (e.g., backhaul link(s) 153). It should be appreciated that macro network platform 1210 typically hands off UE 1275 to femto network platform 1210 once UE 1275 attaches (e.g., through macro-to-femto handover) to femto RAN 1290, which includes a set of deployed femto APs (e.g., femto AP 130) that can operate in accordance with aspects described herein.

It is noted that RAN includes base station(s), or access point(s), and its associated electronic circuitry and deployment site(s), in addition to a wireless radio link operated in accordance with the base station(s). Accordingly, macro RAN 1270 can comprise various coverage cells like cell 105, while femto RAN 1290 can comprise multiple femto cell access points such as femto AP 130. Deployment density in femto RAN 1290 is substantially higher than in macro RAN 1270.

Generally, both macro and femto network platforms 1210 and 1280 include components, e.g., nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In an aspect of the subject innovation, macro network platform 1210 includes CS gateway node(s) 1212 which can interface CS traffic received from legacy networks like telephony network(s) 1040 (e.g., public switched telephone network (PSTN), or public land mobile network (PLMN)) or a SS7 network 1260. Circuit switched gateway 1212 can authorize and authenticate traffic (e.g., voice) arising from such networks. Additionally, CS gateway 1212 can access mobility, or roaming, data generated through SS7 network 1260; for instance, mobility data stored in a VLR, which can reside in memory 1230. Moreover, CS gateway node(s) 1212 interfaces CS-based traffic and signaling and gateway node(s) 1218. As an example, in a 3GPP UMTS network, PS gateway node(s) 1218 can be embodied in gateway GPRS support node(s) (GGSN).

In addition to receiving and processing CS-switched traffic and signaling, PS gateway node(s) 1218 can authorize and authenticate PS-based data sessions with served (e.g., through macro RAN) wireless devices. Data sessions can include traffic exchange with networks external to the macro network platform 1210, like wide area network(s) (WANs) 1250, enterprise networks (NW(s)) 1270 (e.g., enhanced 911), or service NW(s) 1280 like IP multimedia subsystem (IMS); it should be appreciated that local area network(s) (LANs), which may be a part of enterprise NW(s), can also be interfaced with macro network platform 1210 through PS gateway node(s) 1218. Packet-switched gateway node(s) 1218 generates packet data contexts when a data session is established. To that end, in an aspect, PS gateway node(s) 1218 can include a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can include multiple flows that can be generated through server(s) 1214. It is to be noted that in 3GPP UMTS network(s), gateway node(s) 1018 (e.g., GGSN) and tunnel interface (e.g., TTG) comprise a packet data gateway (PDG).

Macro network platform 1210 also includes serving node(s) 1216 that convey the various packetized flows of information, or data streams, received through PS gateway node(s) 1218. As an example, in a 3GPP UMTS network, serving node(s) can be embodied in serving GPRS support node(s) (SGSN).

As indicated above, server(s) 1214 in macro network platform 1210 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can include add-on features to standard services provided by macro network platform 1210. Data streams can be conveyed to PS gateway node(s) 1218 for authorization/authentication and initiation of a data session, and to serving node(s) 1216 for communication thereafter. Server(s) 1214 can also effect security (e.g., implement one or more firewalls) of macro network platform 1210 to ensure network's operation and data integrity in addition to authorization and authentication procedures that CS gateway node(s) 1212 and PS gateway node(s) 1218 can enact. Moreover, server(s) 1214 can provision services from external network(s), e.g., WAN 1250, or Global Positioning System (GPS) network(s), which can be a part of enterprise NW(s) 1280. It is to be noted that server(s) 1214 can include one or more processor configured to confer at least in part the functionality of macro network platform 1210. To that end, the one or more processor can execute code instructions stored in memory 1230, for example.

In example wireless environment 1200, memory 1230 stores information related to operation of macro network platform 1210. Information can include business data associated with subscribers; market plans and strategies, e.g., promotional campaigns, business partnerships; operational data for mobile devices served through macro network platform; service and privacy policies; end-user service logs for law enforcement; and so forth. Memory 1230 can also store information from at least one of telephony network(s) 1240, WAN 1250, SS7 network 1260, enterprise NW(s) 1270, or service NW(s) 1280.

Regarding femto network platform 1281, it includes a femto gateway node(s) 1284, which have substantially the same functionality as PS gateway node(s) 1218. Additionally, femto gateway node(s) 1284 can also include substantially all functionality of serving node(s) 1216. Disparate gateway node(s) 1284 can control or operate disparate sets of deployed femto APs, which can be a part of femto RAN 1290. In an aspect of the subject innovation, femto gateway node(s) 1284 can aggregate operational data received from deployed femto APs. Moreover, femto gateway node(s) 1284 can convey received attachment signaling to server(s) 1282, which can embody at least in part a mobility component and a report component that facilitate, respectively, extraction of visitation data from attachment signaling and supply and delivery of visitation report(s) that convey location information, in accordance with aspects described herein. Clock system 1282 can provide one or more clock strata to manage network time provision and synchronization; clock system 1283 can embody clock layer(s) in example system 200 described hereinbefore.

Memory 1286 can retain additional information relevant to operation of the various components of femto network platform 1281. For example operational information that can be stored in memory 1286 can comprise, but is not limited to, subscriber intelligence; contracted services; maintenance and service records; femto cell configuration (e.g., devices served through femto RAN 1290; authorized subscribers associated with one or more deployed femto APs); service policies and specifications; privacy policies; add-on features; so forth.

In addition to embodying mobility component and report component, server(s) 1282 have substantially the same functionality as described in connection with server(s) 1214. In an aspect, server(s) 1282 can execute multiple application(s) that provide service (e.g., voice and data) to wireless devices served through femto RAN 1290. Server(s) 1282 can also provide security features (e.g., firewall) to femto network platform, and timing management such as implementation of network time protocol (NTP). In addition, server(s) 1282 can manage (e.g., schedule, queue, format . . . ) substantially all packetized flows (e.g., IP-based, frame relay-based, ATM-based) it generates for a femto AP, in addition to data directed to a femto AP and received from macro network platform 1210, or directly from WAN 1250 or service NW(s) 1280, for example. Furthermore, server(s) 1282 can effect provisioning of femto cell service, and effect operations and maintenance. It is to be noted that server(s) 1282 can include one or more processors configured to provide at least in part the functionality of femto network platform 1280. To that end, the one or more processors can execute code instructions stored in memory 1286, for example.

Various aspects or features described herein may be implemented as a method; apparatus, either as hardware or hardware and software or firmware; or article of manufacture using standard programming and/or engineering techniques. Implementation(s) that include software or firmware can be effected at least in part through program modules stored in a memory and executed by one or more processors. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical discs [e.g., compact disk (CD), digital versatile disc (DVD), Blu-ray disc (BD) . . . ], smart cards, and flash memory devices (e.g., card, stick, key drive . . . ).

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, the term "memory" refers to data stores, algorithm stores, and substantially any other information store relevant to operation and functionality of a component comprising the memory; for instance, such information can comprise, but is not limited to, signaling metric thresholds, historical attachment data, subscriber information, femto cell configuration (e.g., devices served by a femto AP), location identifiers, and so forth. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the terms "includes," "has," "possesses," and the like are used in either the detailed description or the claims, such terms are intended to be inclusive in a manner similar to the term "comprising" as "comprising" is interpreted when employed as a transitional word in a claim.

What is claimed is:

1. A system, comprising:
  a mobility component configured to:
    receive attachment signaling associated with a visitation event to a femto access point; and
    extract femto visitation data;
  a report component configured to supply at least one visitation report and include a matrix constructor configured to generate a mobility matrix,
    wherein the at least one visitation report includes location information and is configured to be conveyed by a gateway node, and
    wherein elements of the mobility matrix are counts of visitation events.

2. The system of claim 1, further comprising a clock layer configured to provide timing of the visitation event.

3. The system of claim 1, further comprising the gateway node configured to convey the at least one visitation report.

4. The system of claim 3, wherein the at least one visitation report includes a femto access point location.

5. The system of claim 4, wherein the femto access point location includes a street address.

6. The system of claim 5, wherein the at least one visitation report is formatted in accordance with a markup language.

7. The system of claim 3, wherein the gateway node is configured to receive signaling that determines inclusion of the location information in the at least one visitation report.

8. The system of claim 3, wherein the at least one visitation report includes a mobile device identifier.

9. The system of claim 1, wherein the report component includes an analysis component configured to operate on visitation data to extract a mobility pattern.

10. The system of claim 9, wherein the at least one visitation report includes an inferred mobility event.

11. The system of claim 9, wherein the report component includes an analysis component further configured to operate on visitation data to infer at least one visitation event.

12. The system of claim 1, wherein the location information is real-time location information.

13. The system of claim 1, wherein the location information is historical location information.

14. A method, comprising:
  collecting attachment signaling for a set of mobile devices and a set of femto access points;
  generating femto visitation data for the set of mobile devices and the set of femto access points based, at least, in part, on collected attachment signaling; and
  supplying a report on at least one femto visitation event based, at least, in part, on generated femto visitation data, the report comprising at least one mobility matrix, wherein elements of the at least one mobility matrix are counts of the at least one femto visitation event and wherein the supplying the report comprises supplying the report as historical data that spans a predetermined time interval.

15. The method of claim 14, further comprising conveying the report on the at least one femto visitation event.

16. The method of claim 15, wherein the supplying 15, the report comprises aggregating at least a portion of the femto visitation data for the set of mobile devices and the set of femto access points.

17. The method of claim 14, wherein the supplying the report comprises supplying the report formatted in accordance with markup language.

18. The method of claim 14, wherein the supplying the report is in response to receiving signaling from an entity that consumes location intelligence within the supplied report.

19. The method of claim 18, further comprising generating the at least one mobility matrix based, at least, in part, on aggregated femto visitation data.

20. The method of claim 14, wherein the supplying the report comprises:
  extracting data on the at least one femto visitation event for at least one of the set of mobile devices; and
  generating a report that identifies the mobile device, a location of a femto access point to which the at least one of the set of mobile devices attempted to attach.

21. The method of claim 20, wherein the generating the report that identifies the location of the femto access point comprises generating a report that includes latitude and longitude coordinates.

22. The method of claim 20, further comprising producing a report that conveys the at least one mobility matrix.

23. The method of claim 14, wherein supplying a report comprises:
  analyzing the femto visitation data associated with at least one of the set of mobile devices; and
  inferring a mobility behavior for at least one of the set of mobile devices, the extracting being based, at least, on analyzed femto visitation data.

24. The method of claim 23, wherein the analyzing the femto visitation data includes computing statistics associated with the femto visitation events.

25. The method of claim 23, wherein the inferring the mobility behavior employs machine learning methodologies.

26. The method of claim 23, wherein the analyzing the femto visitation data further comprises generating time and space correlations among at least one of the mobile devices and at least one of the femto access points.

27. The method of claim 23, wherein the analyzing the femto visitation data further comprises identifying clusters of femto visitation events in space and time.

28. The method of claim 14, further comprising extracting a mobility pattern for at least one of the mobile devices.

* * * * *